United States Patent [19]
Ichimura et al.

[11] Patent Number: 6,019,798
[45] Date of Patent: Feb. 1, 2000

[54] PROCESS FOR RECOVERING DYESTUFF FROM DYESTUFF-CONTAINING INFORMATION-RECORDING MEDIA AND SOLVENT USED FOR RECOVERY

[75] Inventors: Mari Ichimura, Kanagawa; Hidemi Tomita, Tokyo, both of Japan

[73] Assignee: Sony Corporation, Tokyo, Japan

[21] Appl. No.: 09/159,570

[22] Filed: Sep. 24, 1998

[30] Foreign Application Priority Data

Sep. 26, 1997 [JP] Japan ................................. 9-261636

[51] Int. Cl.$^7$ .................................................. C09B 67/54
[52] U.S. Cl. .................................................. 8/440; 510/201
[58] Field of Search ................................ 8/440; 510/201, 510/212, 165, 167; 252/188.28; 210/712

[56] References Cited

U.S. PATENT DOCUMENTS 4,735,889  4/1988  Namba et al. ............................ 430/273
5,779,909  7/1998  Tomita et al. ............................ 210/712
5,817,183  10/1998  Eddy-Helenek et al. ................. 134/19

FOREIGN PATENT DOCUMENTS 7-049532  5/1995  Japan .
10-249103  9/1998  Japan .

OTHER PUBLICATIONS

CAPLUS Abstract of Mischke's article entitled "Manufacturing of CD–R Media," Proc. SPEI–Int. Soc. Opt. Eng. 2931, 43–51, Apr. 1996.

English language translation of JP 7–49,532, Mitsui Toatsu Chemicals, pp. 1–16, Dec. 1992.

English language translation of JP 10–249,103, Sony Corporation, pp. 1–22, Sep. 1998.

Mischke et al, "Manufacturing CD–R Media," Proc. SPIE–Int. Soc. Opt. Eng. (2931), pp. 43–51, Apr. 1996.

Primary Examiner—Caroline D. Liott
Attorney, Agent, or Firm—Hill & Simpson

[57] ABSTRACT

The present invention provides a process for efficient recovery of dyestuffs from dye-based optical disks, and to provide a solvent used for recovery. Disclosed herein is a process for recovering dyestuffs from dye-based optical disks by treating the dyestuff-containing layer with a solvent containing a singlet oxygen quencher. Disclosed also herein is a solvent for dyestuff recovery which contains a singlet oxygen quencher.

15 Claims, 1 Drawing Sheet

PROCESS FOR RECOVERING DYESTUFF FROM DYESTUFF-CONTAINING INFORMATION-RECORDING MEDIA AND SOLVENT USED FOR RECOVERY

BACKGROUND OF THE INVENTION

1. Field of the Invention

The present invention relates to a process for recovering from dyestuff-containing information recording media having a dyestuff-containing layer the dyestuff contained in said dyestuff-containing layer, and also to a solvent used for dyestuff recovery.

2. Description of the Related Art

Being capable of high-density recording, optical information recording media are widely used to record music, images, and information. Among other things, compact disks (CD) and discoid recording media of similar type are in general use. Under this situation, the recycling of discoid recording media has become an issue under discussion.

Optical disks now on the market are mostly of the read-only type such as music CD. They are of laminate structure, consisting of a substrate of polycarbonate or the like and a reflecting film of aluminum or the like and a protective film of acrylic resin or the like which are formed consecutively on the substrate (although not shown).

Optical disks of this structure have induced one to devise several methods for their recycling. Among them is crushing disks whole, followed by molding. A disadvantage of this method is that the components of the reflecting film and protective film enter the crushed product, making it impossible to recover the reflecting film only. In addition, this method gives rise to opaque molded products which merely find reuse in limited applications.

By contrast, another method, which is intended to reuse the substrate resin, is by immersing disks in an acidic or alkaline solution so as to dissolve the reflecting film (aluminum) and separate the protective film from the substrate. This method offers an advantage of giving rise to a recovered substrate resin which is transparent and finds reuse in a comparatively wide range of applications, although there is room for improvement in the recovery of the reflecting film.

In the meantime, the family of CD on the market includes recordable CD as well as the above-mentioned read-only CD.

An example of such recordable CD is one which is composed of a substrate of resin such as polycarbonate and laminate layers consecutively formed thereon, including a recording layer with a dyestuff such as cyanine dye, and a reflecting film of gold or aluminum, and a protective film of acrylic resin or the like.

To be more specific, commercially available are dye-based optical disks of write-once type, which are referred to as CD-R (Compact Disk Recordable). Akin to CD-R is DVD-R (Digital Video Disk Recordable) for high-density recording, which is formed by sticking two pieces of CD-R together. These disks are usually capable of writing only once.

In other words, these dye-based optical disks of write-once type have a recording layer which contains a dyestuff. They permit the recording and reproduction of information owing to their property that the recording layer changes in state according as the dye undergoes irreversible change.

In the dye-based optical disk of write-once type as mentioned above, the dyestuff partly changes in its state upon recording (or writing). The rate of change, however, is usually about 20%, with the rest (about 80%) remaining unchanged. In fact, about 80% of the total amount remains unchanged even in the case where the recording pattern is used up.

Since the dyestuff used for the optical disk of this type is expensive and valuable, it is desirable for cost reduction and effective resource use to recover and reuse it efficiently.

One known method for recycling dye-based optical disks resorts to buffing to separate the substrate resin from the reflecting film. A disadvantage of this method is that buffing mechanically removes the dyestuff together with the reflecting film, making its recovery difficult.

At present, the dye-based optical disk of write-once type employs an organic dyestuff (such as cyanine dye and phthalocyanine dye) in its dye-containing layer. In one instance, the dyestuff is mixed with a singlet oxygen quencher.

A quencher is a kind of stabilizer to protect the dyestuff from decomposition. Dyestuff is usually subject to oxidation and decomposition, which decrease its effect, in the presence of oxygen and light. A common way to protect dyestuff from deactivation (oxidation and decomposition) by oxygen is to incorporate a quencher into the dyestuff-containing layer beforehand.

Because the deactivation of dyestuff takes place in the presence of oxygen and light, no singlet oxygen quencher is necessary if the dyestuff-containing layer is closely sealed and completely isolated from oxygen by the reflecting film and protective film immediately after the spin coating and drying of the dyestuff-containing material. In fact, there exists a dye-based optical disk containing no quencher.

Dyestuff is subject to photo-oxidative decomposition, as mentioned above. However, it is practically very difficult to completely shut out oxygen in the course of dyestuff recovery which involves steps of dissolving the dyestuff-containing layer, concentrating the resulting solution, and separating the desired dyestuff by column chromatography. Moreover, there is an instance where the dyestuff is incorporated with a photosensitizer which would promote deactivation upon heating for concentration. Especially, an efficient recovery of dyestuff from the dyestuff-containing layer free from quencher is difficult.

Even though the dyestuff-containing layer is incorporated with a singlet oxygen quencher beforehand, it is difficult to prevent the entrance of oxygen, thereby protecting the dyestuff from oxidation and decomposition completely, in various steps in the course of dyestuff recovery. In other words, the recovery of dyestuff from the dyestuff-containing layer with a singlet oxygen quencher is also limited in efficiency.

SUMMARY OF THE INVENTION

The present invention was completed to address the above-mentioned problems involved in the prior art technology. It is an object of the present invention to provide a process for recovering from dyestuff-containing information recording media having a dyestuff-containing layer the dyestuff contained in said dyestuff-containing layer, and also to provide a solvent used for dyestuff recovery.

After a series of researches conducted to address the above-mentioned problem, the present inventors found that it is possible to recover the desired dyestuff efficiently from dye-containing information recording media (such as dye-based optical disks of write-once type) having a dyestuff-containing layer by treating the dyestuff-containing layer with a solvent containing a singlet oxygen quencher prior to dyestuff recovery.

The gist of the present invention resides in a process for recovering from dyestuff-containing information recording media having at least a dyestuff-containing layer the dyestuff contained in said dyestuff-containing layer, said process comprising treating said dyestuff-containing layer with a solvent containing a singlet oxygen quencher. (This process will be referred to as the dyestuff recovery process of the invention hereinafter.)

The dyestuff recovery process of the invention involves treatment of the dyestuff-containing layer with a solvent containing a singlet oxygen quencher. This offers an advantage of protecting the dyestuff from photo-oxidative decomposition and state change by oxygen, because the singlet oxygen quencher is more reactive to oxygen (active oxygen or excited singlet oxygen) than to the dyestuff. The result is an efficient recovery of the dyestuff in high purity.

By the singlet oxygen quencher mentioned above is meant an agent to deactivate singlet oxygen which affects the oxidation of the dyestuff. It reacts preferentially with oxygen, thereby protecting the dyestuff from oxidation. (A detailed description will be given later.)

The gist of the present invention resides also in a solvent used to recover from dyestuff-containing information recording media having at least a dyestuff-containing layer the dyestuff contained in said dyestuff-containing layer, said solvent containing therein a singlet oxygen quencher. (This solvent will be referred to as the dyestuff recovery solvent of the invention hereinafter.)

The dyestuff recovery solvent of the present invention protects the dyestuff from decomposition and state change by oxygen for the same reason as above. Therefore, it permits stable dissolution of the dyestuff in high concentrations, which in turn leads to an efficient recovery of the dyestuff in high purity.

DESCRIPTION OF THE PREFERRED EMBODIMENTS

Figure 1:
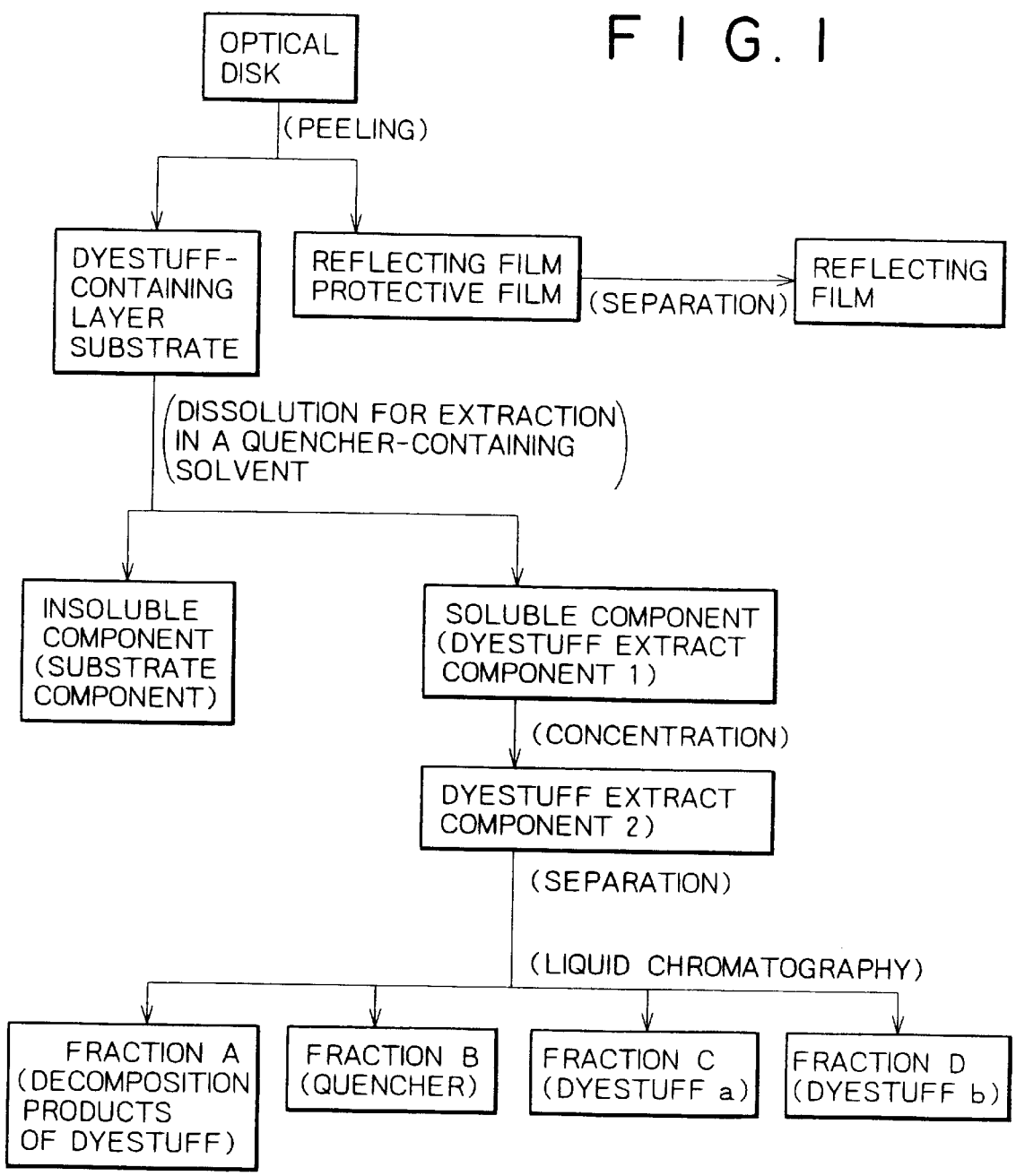
FIG. 1 is a flow chart showing the procedure for recovering dyestuffs according to the dyestuff recovery process of the invention.

First, the action of the singlet oxygen quencher will be explained in the following.

Dyestuff usually exists in the stable ground state. However, it assumes the excited triplet state when acted on by ultraviolet rays. Such an excited dyestuff is active enough to react with triplet oxygen (ordinary molecular oxygen) in the presence of oxygen, thereby forming singlet oxygen. This singlet oxygen is so active as to react with the dyestuff to oxidize, decompose, and disable it.

The singlet oxygen quencher, which is more reactive to singlet oxygen than to dyestuff, reacts preferentially with singlet oxygen, thereby protecting the dyestuff from photo-oxidative decomposition.

If a solvent containing the singlet oxygen quencher is used to treat the dyestuff-containing layer at the time of recovery from dye-based optical disks the dyestuff contained in the dyestuff-containing layer, it is possible to protect the dyestuff from oxidation and decomposition, thereby permitting an efficient recovery of the dyestuff. Incidentally, the singlet oxygen quencher may be regarded as a kind of trapping agent for singlet oxygen rather than a UV light absorber.

The following is an explanation of the dyestuff recovery process of the invention.

According to the dyestuff recovery process of the present invention, the above-mentioned dyestuff-containing information recording media are a dye-based optical disk of write-once type (such as CD-R) which is composed at least of a substrate, a dyestuff-containing layer as a recording layer, a reflecting film, and a protective film, which are arranged in the order mentioned. The process comprises a first step of separating (or peeling) said substrate and said dyestuff-containing layer from said reflecting film and said protective film, a second step of extracting said dyestuff from said dyestuff-containing layer using a solvent containing said singlet oxygen quencher, a third step of concentrating said dyestuff, which has been extracted in said second step, by using a rotary evaporator or the like, and a fourth step of separating said dyestuff, which has been concentrated in said third step, by means of liquid chromatography or the like.

The process comprising the above-mentioned steps permits the efficient recovery of said dyestuff in high purity. It also permits the adequate recovery of said substrate, said reflecting film, and said protective film.

In the dyestuff recovery process of the invention, it is desirable that said solvent be freed of oxygen and then incorporated with said singlet oxygen quencher before it is used for dyestuff recovery. The removal of oxygen from said solvent may be accomplished by introducing (bubbling) an inert gas, such as nitrogen and argon into said solvent.

Said dyestuff is stable (with a weak tendency to become deactivated) by nature in an inert gas atmosphere or in the absence of oxygen. In actual dyestuff recovery, however, it will come into contact with oxygen because it is difficult to keep the dyestuff from oxygen completely during dissolution, concentration, and separation, or during transfer from one step to another.

Oxygen removal by bubbling, which can be carried out with a comparatively simple equipment, is effective in reducing the amount of said singlet oxygen quencher used in the dyestuff recovery process of the invention and also in suppressing the decomposition of said dyestuff further.

In practicing the dyestuff recovery process of the invention, it is desirable to carry out at least the first step in an inert gas atmosphere in the dark in order to protect said dyestuff from photo-oxidative decomposition in the first to fourth steps. It is also desirable to carry out concentration (in the third step) under reduced pressure at a temperature lower than 40° C., taking into account the efficiency of solvent evaporation and the decomposition temperature of the dyestuff.

For the reasons mentioned above, it is desirable to carry out the first to fourth steps and other additional steps in the dark in an inert gas atmosphere, under reduced pressure at a temperature lower than 40° C., preferably lower than 30° C.

In the dyestuff recovery process of the invention, there are no restrictions as to the solvent in which the singlet oxygen quencher is dissolved so long as it dissolves said dyestuff. However, the solvent should preferably be one which does not dissolve said substrate (particularly polycarbonate).

Examples of the solvent include alcohols (such as methanol, ethanol, isopropyl alcohol (PIA), and n-butanol), 1,2-ethanediol, glycerin, cellosolves (such as methyl cellosolve and ethyl cellosolve), and hydroxyketones (such as 2-hydroxy-2-methyl-3-butanone, 4-hydroxy-2-butanone, and diacetone alcohol).

In the dyestuff recovery process of the invention, it is desirable that the content of said singlet oxygen quencher in said solvent be from 1 wt % to 10 wt %.

With a content less than 1 wt %, the singlet oxygen quencher is poor in action. With a content in excess of 10 wt %, the superfluous singlet oxygen quencher may contaminate the eluate of chromatography for dyestuff separation and purification.

The content of the singlet oxygen quencher in the solvent for treatment of the dyestuff-containing layer should be from 1 wt % to 10 wt %, preferably from 3 wt % to 10 wt %, more preferably 3 wt % to 7 wt %, so that the dyestuff can be recovered at a rate higher than 50% and in a purity higher than 95%.

The singlet oxygen quencher used in the dyestuff recovery process of the invention should preferably be one or more species selected from the group consisting of conjugated polyenes, transition metal complexes, amines including hindered amines (HALS), aminium salts, and iminium slats.

The singlet oxygen quencher is exemplified by those compounds represented by chemical formulas 1 to 13 below. Any other compounds may be used so long as they meet the above-mentioned requirements.

Those compounds represented by chemical formula 1 are conjugated polyenes; those compounds represented by chemical formulas 2 to 7 are transition metal complexes or transition metal compounds; those compounds represented by chemical formulas 8 to 10 are hindered amines; those compounds represented by chemical formula 11 are amines; those compounds represented by chemical formula 12 are iminium salts; and those compounds represented by chemical formula 13 are aminium salts.

Chemical formula 1

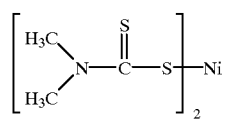

Chemical formula 2

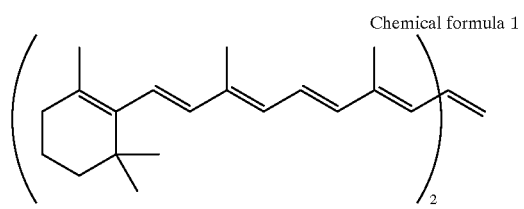

Chemical formula 3

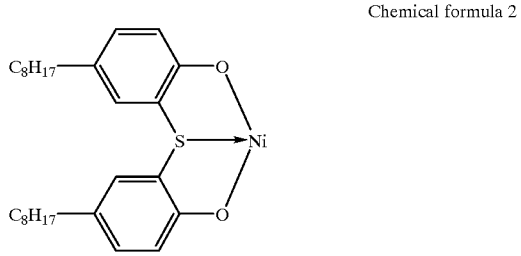

-continued

Chemical formula 4

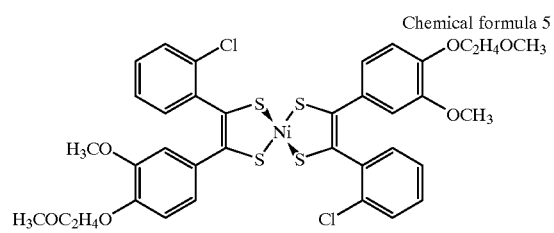

Chemical formula 5

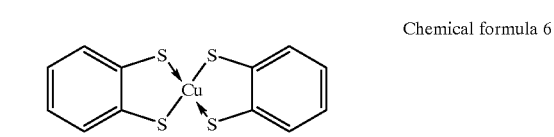

Chemical formula 6

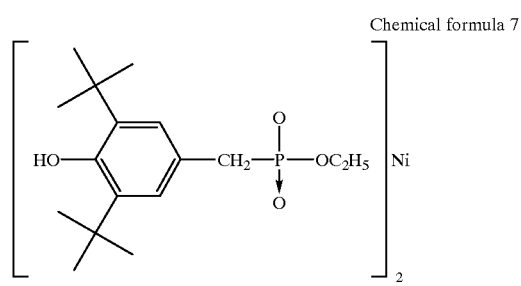

Chemical formula 7

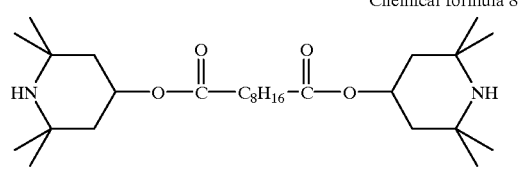

Chemical formula 8

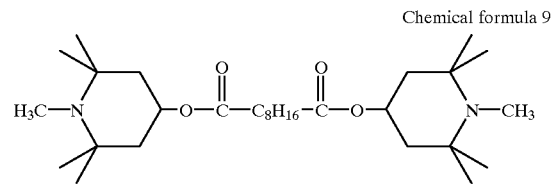

Chemical formula 9

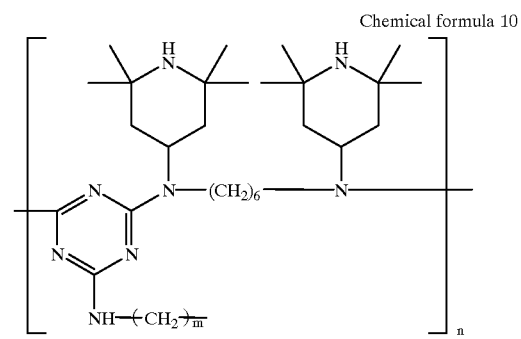

Chemical formula 10

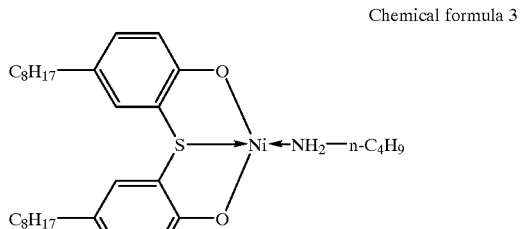

Chemical formula 11

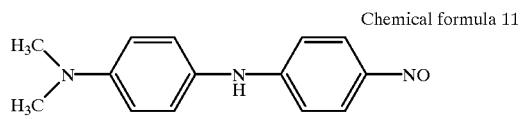

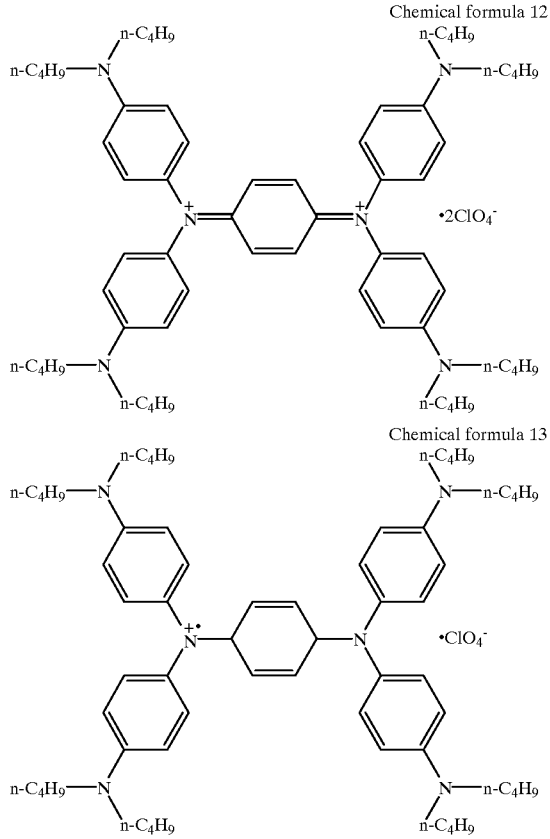

Chemical formula 12

Chemical formula 13

In the dyestuff recovery process of the invention, the fourth step to separate the dyestuff may be carried out by using several solvents which sequentially increase in polarity. A solvent with the highest polarity is used for the final stage of dyestuff recovery in the case where said fourth step employs silica gel chromatography.

The following is an explanation of the solvent used for dyestuff recovery.

The above-mentioned solvent for dyestuff recovery should preferably be freed of oxygen and incorporated with the above-mentioned singlet oxygen quencher prior to its use, for the same reason mentioned above. To be more specific, the removal of oxygen may be accomplished by the introduction of an inert gas into the solvent.

As in the case mentioned above, the content of the singlet oxygen quencher in the solvent for dyestuff recovery should be from 1 wt % to 10 wt %, preferably from 3 wt % to 10 wt %, and more preferably from 3 wt % to 7 wt %.

The singlet oxygen quencher to be added to the solvent for dyestuff recovery should preferably be one or more species selected from the group consisting of conjugated polyenes, transition metal complexes, amines including hindered amines, aminium salts, and iminium slats. Their examples include those compounds represented by chemical formulas 1 to 13 given above.

The solvent for dyestuff recovery should preferably be one which dissolves said dyestuff but does not dissolve said substrate. This solvent may be the same one as mentioned above.

A preferred embodiment to recover a dyestuff from dye-based optical disks according to the dyestuff recovery process of the invention will be explained with reference to FIGS. 1 and 2.

Figure 2:
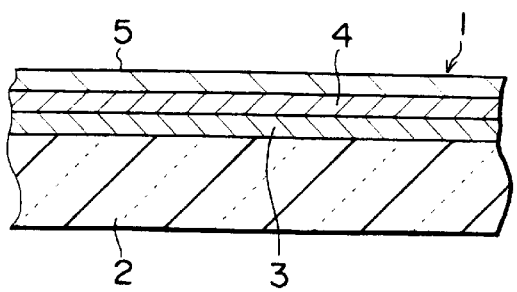
FIG. 2 is a schematic sectional view showing important parts of the dye-based optical disk to which is applied the dyestuff recovery process of the invention.

FIG. 2 is a schematic sectional view showing a dye-based optical disk 1 consisting of a substrate 2 of polycarbonate resin or the like, a dyestuff-containing layer 3 (as a recording layer containing a dyestuff such as cyanine dye), a reflecting film 4 of gold or aluminum, and a protective film 5 of acrylic resin or the like, which are arranged in the order mentioned. Incidentally, the substrate 2 has guide grooves (pits), which are not shown.

FIG. 1 is a flow diagram illustrating the procedure of dyestuff recovery according to the dyestuff recovery process of the invention. FIG. 1 refers to the following explanation.

The process starts with separating a dye-based optical disk into two parts, one consisting of a substrate and a dyestuff-containing layer and the other consisting of a reflecting film and a protective film. This peeling step may be accomplished in an inert gas atmosphere in the dark, or in an aqueous solution(preferably free of oxygen) containing a surface active agent, with or without ultrasonic irradiation. Effective peeling may be accomplished by such preliminary steps as scratching the protective film of the disk or crushing the disk into pieces of adequate size.

Scratching may be accomplished by using an edged tool, an electrically heated wire, or a laser beam. There are no specific restrictions on the way of scratching (such as depth and position). It is desirable that scratching be deep enough to reach the dyestuff-containing layer.

After separation in the first step, the reflecting film and the protective film may be separated from each other for the recovery of gold from the reflecting film and the recovery of acrylic resin from the protective film.

In the second step, the substrate carrying the dyestuff-containing layer, with the reflecting and protective films removed, is immersed in or sprayed with a solution containing the above-mentioned singlet oxygen quencher, so that the dyestuff-containing layer is dissolved. Thus, separation into an insoluble component (or substrate component) and a soluble component (or dyestuff extract component 1) is accomplished.

Subsequently, the insoluble component is removed by filtration or any other means. The thus obtained dyestuff extract component 1 is concentrated by using a rotary evaporator or the like. The concentration step should be carried out under reduced pressure at a temperature lower than 40° C., preferably lower than 30° C., in consideration of the efficiency of solvent evaporation and the condition of dyestuff decomposition. In this way there is obtained the dyestuff extract component 2. Needless to say, the insoluble substrate component (such as polycarbonate resin) is recovered and reused.

Next, the concentrated dyestuff (or the dyestuff extract component 2) undergoes separation and purification by recrystallization or liquid chromatography. An object of recovering a dyestuff in high purity may be achieved by using the latter (alternatively high-performance liquid chromatography). Silica gel chromatography is particularly recommended.

Solvents for elution are not specifically restricted. They include such less reactive solvents as aliphatic hydrocarbons, aromatic hydrocarbons, halogenated hydrocarbons, alcohols, and esters. More than one solvent should be used in combination so that the resulting mixture has an adequate polarity. Typical examples are ethanol, n-hexane, n-heptane, cyclohexane, benzene, toluene, dichloromethane, chloroform, and ethyl acetate.

For silica gel chromatography, it is desirable to prepare the column from silica gel and a solvent which has previously been freed of oxygen by bubbling with an inert gas. For high-performance liquid chromatography, it is desirable to completely clear the column of oxygen by means of a solvent which has previously been freed of oxygen by bubbling with an inert gas.

The elution (separation and extraction) of the dyestuff may be accomplished by using a single solvent from start to finish or by using several polar solvents one after another in order of increasing polarity. (The latter is referred to as gradient method.)

In the case where the dyestuff-containing layer contains two dyestuffs (dyestuff a and dyestuff b), the dyestuff extract component 2 obtained as mentioned above may be divided into four fractions: fraction A (dyestuff decomposition product), fraction B (quencher), fraction C (dyestuff a), and fraction D (dyestuff b), as shown in FIG. 1. It is from the last two fractions that the two dyestuffs are recovered.

The four fractions (A, B, C, and D) may be obtained in the order mentioned according as the polarity of the solvent increases. This is not always the case, however.

After sequential elution (separation) by adequately combined solvents, each fraction is concentrated by using a rotary evaporator or the like, preferably under reduced pressure at a temperature lower than 40° C., preferably lower than 30° C.

The resulting concentrates (solids) are tested for the identification and purity of dyestuffs by nuclear magnetic resonance spectroscopy, infrared spectroscopy, UV light and visible light spectroscopy, mass spectrometry, etc. In this way it is possible to efficiently recover from optical disks the dyestuff component in high purity.

The above-mentioned procedure according to the dyestuff recovery process of the invention permits not only the recovery of dyestuffs but also the separation and extraction (for reuse) of the singlet oxygen quencher incorporated into the solvent (which is referred to as fraction B in FIG. 1).

The above-mentioned preferred embodiments are not intended to restrict the scope of the invention.

In other words, the dyestuff recovery process of the invention may be applied to any recording media having a dyestuff-containing layer (such as DVD-R), which are not restricted to dye-based optical disks such as CD-R. In addition, the recording media may be in the form of tape as well as disk. They may be used ones or unused ones.

The dyestuff recovery process of the invention may be applied to any dyestuffs which are not specifically restricted. Some examples include those which are represented by the following structural formulas 1 to 5.

Structural formula 1

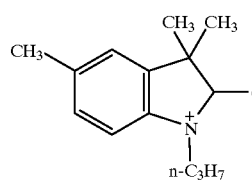

Structural formula 2

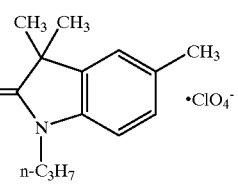

Structural formula 3

Structural formula 4

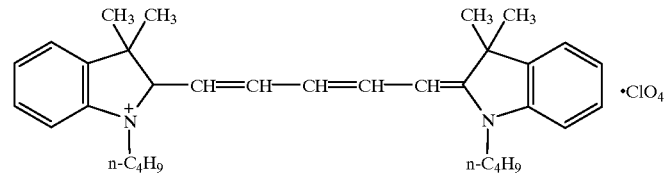

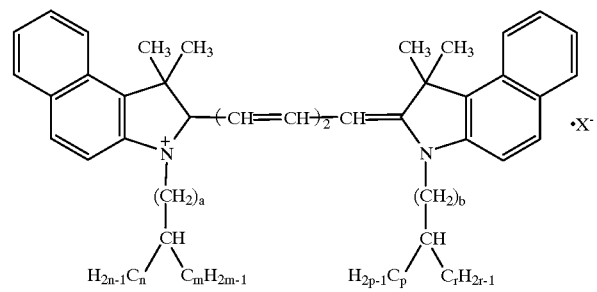

Structural formula 5

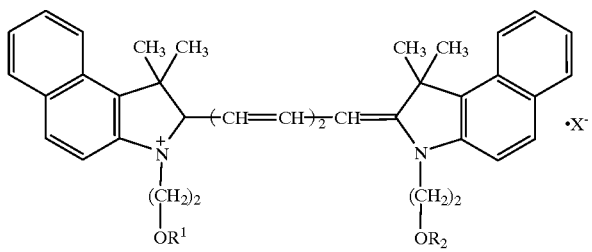

Structural formula 1 represents an indoline-based (pentamethine) cyanine dye (NK-3825 available from Nippon Kanko Shikiso Kenkyusho Co., Ltd.). Structural formula 2 represents a benzoindoline-based (pentamethine) cyanine dye (NK-3219 available from Nippon Kanko Shikiso Kenkyusho Co., Ltd.). Structural formula 3 represents an indoline-based (pentamethine) cyanine dye (NK-3383 available from Nippon Kanko Shikiso Kenkyusho Co., Ltd.). Structural formulas 4 and 5 represent a benzoindoline-based pentamethinecyanine dye. In structural formula 4, a and b each denotes an integer of 0 to 5; m, n, p, and r each denotes an integer of 1 to 12; X- denotes a counter ion such as Cl—, Br—, I—, OH—, $ClO_4$—, $BF_4$—, and $PF_6$—. In structural formula 5, $R^1$ and R2 each denotes a hydrogen atom or a $C_{1-18}$ linear or branched alkyl group; and X- is defined as above.

The dyestuff recovery process of the invention may be applied to the dye-based optical disks which are classified into two types depending on whether their dyestuff-containing layer (recording layer) is composed of a dyestuff alone or composed of a dyestuff and a singlet oxygen quencher. It permits an efficient recovery of dyestuff in high purity, while protecting the dyestuff from photo-oxidative decomposition during recovery.

EXAMPLES

The invention will be described in more detail with reference to the following examples, which are not intended to restrict the scope of the invention.

First, dye-based optical disks constructed as shown in FIG. 2 were prepared in the following manner.

A polycarbonate substrate 2 for CD-R (12 cm in diameter) was spin-coated with a dyestuff solution in diacetone alcohol which contains the following two dyestuffs mixed in a ratio of 1:1, so that a dyestuff-containing layer 3 (recording layer), 0.1 μm thick, was formed thereon.

Dyestuff a : benzoindoline-based cyanine dye represented by the structural formula 2 above. (NK-3219 available from Nippon Kanko Shikiso Kenkyusho Co., Ltd.)

Dyestuff b : indoline-based cyanine dye represented by the structural formula 3 above. (NK-3383 available from Nippon Kanko Shikiso Kenkyusho Co., Ltd.)

On the dyestuff-containing layer 3 was formed a reflecting film 4 (0.1 μm thick) from gold by vapor deposition. This step was followed by spin-coating with a UV-curable acrylic resin, which was subsequently cured by UV irradiation, so as to form a protective film 5. In this way there was obtained a dye-based optical disk of write-once type 1 (which will be referred to as disk hereinafter). Incidentally, the substrate 2 has pits.

Example 1

Dyestuff recovery from the disk was carried out according to the procedure shown in FIG. 1.

The protective film of the disk was scratched with a razor blade in a cross-hatch pattern at intervals of 1 cm. The disk was separated into two parts A and B (A consisting of the dyestuff-containing layer 3 and the substrate 2, and B consisting of the reflecting film 4 and the protective film 5), in a nitrogen atmosphere in the dark.

A 5 wt % ethanol solution was prepared by dissolving in ethanol (which had been freed of oxygen by bubbling with nitrogen) a nitrosophenylamine-based singlet oxygen quencher (Q-02 available from Nippon Kanko Shikiso Kenkyusho Co., Ltd.). This solution containing a singlet oxygen quencher is referred to as solvent A hereinafter.

In this solvent A was immersed the part A (consisting of the dyestuff-containing layer 3 and the substrate 2) so as to dissolve the constituent of the dyestuff-containing layer. Thus there were obtained an insoluble component and a soluble component (dyestuff extract component).

After filtration to remove the insoluble component (originating from the substrate), the soluble component (dyestuff extract component) was concentrated using a rotary evaporator under reduced pressure at a temperature lower than 40° C.

For separation and purification, the resulting concentrate underwent silica gel chromatography eluted with a chloroform-ethanol mixed solvent. The column for chromatography was completely freed of oxygen beforehand. Gradient elution was employed in which the polarity of the eluent (solvent) was gradually increased by changing the mixing ratio of chloroform to ethanol from 20:1 to 1:1 by volume.

The gradient elution gave four fractions. Each fraction was concentrated by using a rotary evaporator under reduced pressure at a temperature lower than 40° C.

Solid samples obtained from the four fractions A, B, C, and D were analyzed by nuclear magnetic resonance spectroscopy, infrared spectroscopy, UV light and visible light spectroscopy, and mass spectrometry. They were identified as shown below.

Fraction A: aromatic compounds (presumably decomposition products of the dyestuffs)
Fraction B: singlet oxygen quencher (Q-02)
Fraction C: dyestuff a (recovery=65%)
Fraction D: dyestuff b (recovery=63%)

Incidentally, the dyestuffs in fractions C and D were found to have purities higher than 95%. The recoveries of fractions C and D were calculated from their weight in terms of ratio (by weight) to the amount of each dyestuff in the disk.

Moreover, it was found that part of the singlet oxygen quencher (Q-02) in fraction B was reusable. As shown above, this example permits efficient recovery of both dyestuffs a and b in high purity.

Example 2

A solution containing 1 wt % singlet oxygen quencher (Q-02) in ethanol was prepared. This solution will be referred to as solvent B hereinafter. Excepting that the solution A was replaced by solution B, the same procedure as in Example 1 was repeated to recover the dyestuff component. The following four fractions A to D were obtained.

Fraction A: aromatic compounds (presumably decomposition products of the dyestuffs)
Fraction B: singlet oxygen quencher (Q-02)
Fraction C: dyestuff a (recovery=45%)
Fraction D: dyestuff b (recovery=40%)

Example 2 that employed solvent B (containing 1 wt % quencher) was comparable to Example 1 in efficient recovery of dyestuffs in high purity although it is slightly poor in the recoveries of dyestuffs in fractions C and D.

Example 3

A solution containing 10 wt % singlet oxygen quencher (Q-02) in diacetone alcohol was prepared. This solution will be referred to as solvent C hereinafter. Excepting that the solution A was replaced by solution C, the same procedure as in Example 1 was repeated to recover the dyestuff component. The following four fractions A to D were obtained.

Fraction A: aromatic compounds (presumably decomposition products of the dyestuffs)
Fraction B: singlet oxygen quencher (Q-02)
Fraction C: dyestuff a
Fraction D: dyestuff b Example 3 that employed solvent C (containing 10 wt % quencher) was slightly poor in the recoveries of dyestuffs in fractions C and D as compared with Example 1. In addition, overlapping bands were observed which are presumably due to the entrance of the quencher into each fraction. Nevertheless, Example 3 is capable of efficient recovery of dyestuffs in comparatively high purity in view of the fact that the dyestuffs a and b in fractions C and D have a purity of about 70% or less.

Comparative Example 1

The same procedure as in Example 1 was repeated except that the ethanol solution of quencher was replaced by neat ethanol which had been freed of oxygen by bubbling with nitrogen. The following four fractions A to D were obtained.

Fraction A: aromatic compounds (presumably decomposition products of the dyestuffs)
Fraction B: singlet oxygen quencher (Q-02)
Fraction C: dyestuff a (recovery=24%)
Fraction D: dyestuff b (recovery=19%)

Extraction with the solvent containing no singlet oxygen quencher gave fractions A and B which are similar in composition to those obtained in Example 1. However, it gave fractions C and D resulting in extremely low recoveries of dyestuffs a and b as indicated by analysis and weighing.

The above-mentioned Examples demonstrated that dyestuffs poor in light resistance and vulnerable to oxidation and decomposition can be recovered efficiently in high purity by treatment with a solvent containing a singlet oxygen quencher.

The dyestuff recovery process of the invention is designed to recover from dyestuff-containing information recording media having at least a dyestuff-containing layer dyestuffs contained in said dyestuff-containing layer by treating said dyestuff-containing layer with a solvent containing a singlet oxygen quencher. The singlet oxygen quencher is reactive more to said dyestuff than to oxygen, so that it protects said dyestuff from photo-oxidative decomposition and state change by oxygen. This leads to efficient recovery of said dyestuff in high purity.

In addition, the dyestuff recovery solvent of the invention is designed to be used to recover from dyestuff-containing information recording media having at least a dyestuff-containing layer dyestuffs contained in said dyestuff-containing layer. It contains a singlet-oxygen quencher, so that, for the same reason mentioned above, it dissolves said dyestuffs stably in high concentrations while protecting said dyestuffs from decomposition and state change.

What is claimed is:

1. A process for recovering dyestuff from dyestuff-containing information recording media comprising a dyestuff containing layer, said process comprising:

treating said dyestuff-containing layer with a solvent which dissolves said dyestuff and which contains a singlet oxygen quencher; and separating and recovering said dyestuff.

2. A process for dye recovery from dyestuff-containing information recording media as defined in claim 1, wherein said dyestuff-containing information recording media arc a dye-based optical disk, said dye-based optical disk comprising, in sequential order, a substrate, a dyestuff-containing layer as a recording layer, a reflecting film, and a protective film, said process comprises:

a first step of separating said substrate and said dyestuff-containing layer from said reflecting film and said protective film, a second step of extracting said dyestuff from said dyestuff-containing, layer by dissolving said dyestuff in said solvent containing said singlet oxygen quencher, a third step of concentrating said dyestuff which has been extracted in said second step, and a fourth step of separating said dyestuff which has been concentrated in said third step.

3. A process for dye recovery from dyestuff-containing information recording media as defined in claim 1, wherein said solvent is freed of oxygen and subsequently incorporated with said singlet oxygen quencher.

4. A process for dye recovery from dyestuff-containing information recording media as defined in claim 3, wherein said solvent is freed of oxygen by introduction of an inert gas thereinto.

5. A process for dye recovery from dyestuff-containing information recording media as defined in claim 2, wherein at least one of the first to fourth steps is carried out in an inert gas atmosphere in the dark and concentration in the third step is carried out under reduced pressure at a temperature lower than 40° C.

6. A process for dye recovery from dyestuff-containing information recording media as defined in claim 2, wherein said solvent is one which dissolves said dyestuff but does not dissolve said substrate.

7. A process for dye recovery from dyestuff-containing information recording media as defined in claim 1, wherein the content of said singlet oxygen quencher is more than 1 wt % of said solvent.

8. A process for dye recovery from dyestuff-containing information recording media as defined in claim 1, wherein the content of said singlet oxygen quencher is less than 10 wt % of said solvent.

9. A process for dye recovery from dyestuff-containing information recording media as defined in claim 1, wherein said singlet oxygen quencher is at least one species selected from the group consisting of conjugated polyenes, transition metal complexes, amines, hindered amines, aminium salts, and iminium salts.

10. A process for dye recovery from dyestuff-containing information recording media as defined in claim 2, wherein said fourth step is further defined by separating said dyestuff with a polar solvent mixture containing a plurality of elution solvents, wherein the polarity of said polar solvent mixture is changed stepwise by changing, the mixing ratio of said elution solvents in said polar solvent mixture.

11. A process for dye recovery from dyestuff-containing information recording media as defined in claim 10, wherein said fourth step is further defined by separating said dyestuff with silica gel chromatography and said polar solvent mixture is increased stepwise in polarity by changing the mixing ratio of said elution solvents in said polar solvent mixture and the recovery of said dyestuff is accomplished at the highest polarity.

12. A process for recovering dyestuff from dyestuff-containing information recording media comprising a dyestuff containing layer and a substrate, said process comprising:

treating said dyestuff-containing layer with a solvent containing a singlet oxygen quencher; and separating and recovering said dyestuff, wherein said solvent dissolves said dyestuff but does not dissolve said substrate.

13. A process for recovering dyestuff from dyestuff-containing information recording media as claimed in claim 1, wherein the solvent is selected from the group consisting of: alcohols, 1,2-ethanediol, glycerin, cellosolves, and hydroxyketones.

14. A process for dye recovery from dyestuff-containing information recording media as defined in claim 2, wherein said fourth step is further defined by separating said dyestuff with a single polar solvent.

15. A process for dye recovery from dyestuff-containing, information recording media as defined in claim 2, wherein said fourth step is further defined by separating said dyestuff with a plurality of polar solvents in order of increasing polarity.

\* \* \* \* \*